(12) United States Patent
Kusafuka

(10) Patent No.: US 11,966,051 B2
(45) Date of Patent: Apr. 23, 2024

(54) THREE-DIMENSIONAL DISPLAY DEVICE, THREE-DIMENSIONAL DISPLAY SYSTEM, HEAD-UP DISPLAY SYSTEM, AND MOVABLE OBJECT

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/265,255

(22) PCT Filed: Aug. 8, 2019

(86) PCT No.: PCT/JP2019/031496
§ 371 (c)(1),
(2) Date: Feb. 2, 2021

(87) PCT Pub. No.: WO2020/032212
PCT Pub. Date: Feb. 13, 2020

(65) Prior Publication Data
US 2021/0302729 A1    Sep. 30, 2021

(30) Foreign Application Priority Data
Aug. 8, 2018    (JP) .................................. 2018-149305

(51) Int. Cl.
*G02B 27/01* (2006.01)
*G02B 27/00* (2006.01)
(Continued)

(52) U.S. Cl.
CPC ......... *G02B 27/0101* (2013.01); *G02B 30/27* (2020.01); *G02B 30/31* (2020.01);
(Continued)

(58) Field of Classification Search
CPC .... G02B 27/01; G02B 27/0101; G02B 30/27; G02B 2027/0138; G02B 2027/0163;
(Continued)

(56) References Cited

U.S. PATENT DOCUMENTS 6,970,290 B1    11/2005 Mashitani et al.
2006/0170764 A1    8/2006 Hentschke
(Continued)

FOREIGN PATENT DOCUMENTS

CN    102480628 A    5/2012
EP    2456211 A2    5/2012
(Continued)

*Primary Examiner* — Amy Onyekaba
*Assistant Examiner* — Cory A Almeida
(74) *Attorney, Agent, or Firm* — Studebaker & Brackett PC

(57) ABSTRACT

The device (3) includes a display panel (6), a shutter panel (7), and a controller (8). The display panel (6) includes subpixels for displaying a parallax image including a first image and a second image having parallax between the images. The shutter panel (7) is configured to define a traveling direction of image light representing the parallax image from the display panel (6). The controller (8) is configured to change, in a certain time cycle, areas on the shutter panel in a light transmissive state to transmit the image light with at least a certain transmittance and areas in a light attenuating state to transmit the image light with a transmittance lower than the transmittance in the light transmissive state, and is configured to change the subpixels to display the first image and the second image based on positions of the areas in the light transmissive state.

20 Claims, 13 Drawing Sheets

(51) Int. Cl.
*G02B 30/27* (2020.01)
*G02B 30/31* (2020.01)
*G09F 9/302* (2006.01)
*G09G 5/38* (2006.01)
*H04N 13/315* (2018.01)
*H04N 13/376* (2018.01)

(52) U.S. Cl.
CPC ............. *G09F 9/3023* (2013.01); *G09G 5/38* (2013.01); *H04N 13/315* (2018.05); *H04N 13/376* (2018.05); *G02B 27/0093* (2013.01); *G02B 2027/0138* (2013.01); *G02B 2027/0163* (2013.01); *G02B 2027/0183* (2013.01); *G02B 2027/0187* (2013.01)

(58) Field of Classification Search
CPC .... G02B 2027/0183; G02B 2027/0187; G02B 27/0093; G02B 30/31; H04N 13/315; H04N 13/376; G09F 9/3023; G09G 5/38
See application file for complete search history.

(56) References Cited

U.S. PATENT DOCUMENTS

| | | | |
|---|---|---|---|
| 2011/0157171 A1* | 6/2011 | Lin | H04N 13/315 345/419 |
| 2012/0127286 A1 | 5/2012 | Sato et al. | |
| 2012/0242723 A1* | 9/2012 | Miyake | G09G 3/32 345/694 |
| 2012/0293500 A1* | 11/2012 | Nakahata | G09G 3/3648 345/208 |
| 2013/0201091 A1* | 8/2013 | Hung | G02B 30/27 362/97.1 |
| 2013/0286168 A1 | 10/2013 | Park et al. | |
| 2016/0325683 A1* | 11/2016 | Hayashi | H04N 13/279 |
| 2018/0242413 A1* | 8/2018 | Hue | H05B 45/3725 |

FOREIGN PATENT DOCUMENTS

| | | |
|---|---|---|
| JP | H09-138370 A | 5/1997 |
| JP | 2001-166259 A | 6/2001 |
| JP | 2006-520921 A | 9/2006 |
| JP | 2014-509465 A | 4/2014 |
| JP | 2018-120189 A | 8/2018 |

* cited by examiner

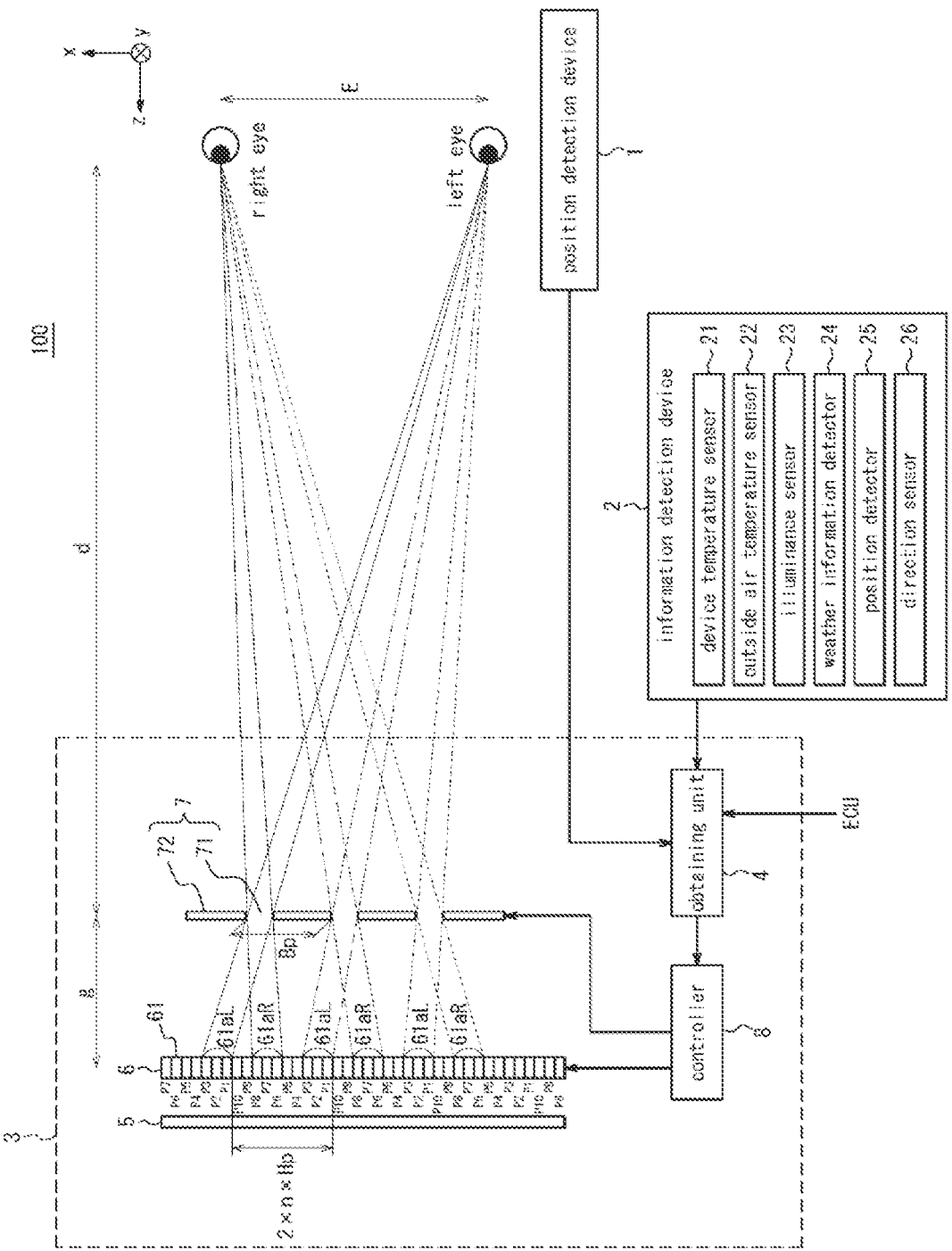
[Fig. 1]

[Fig. 2]
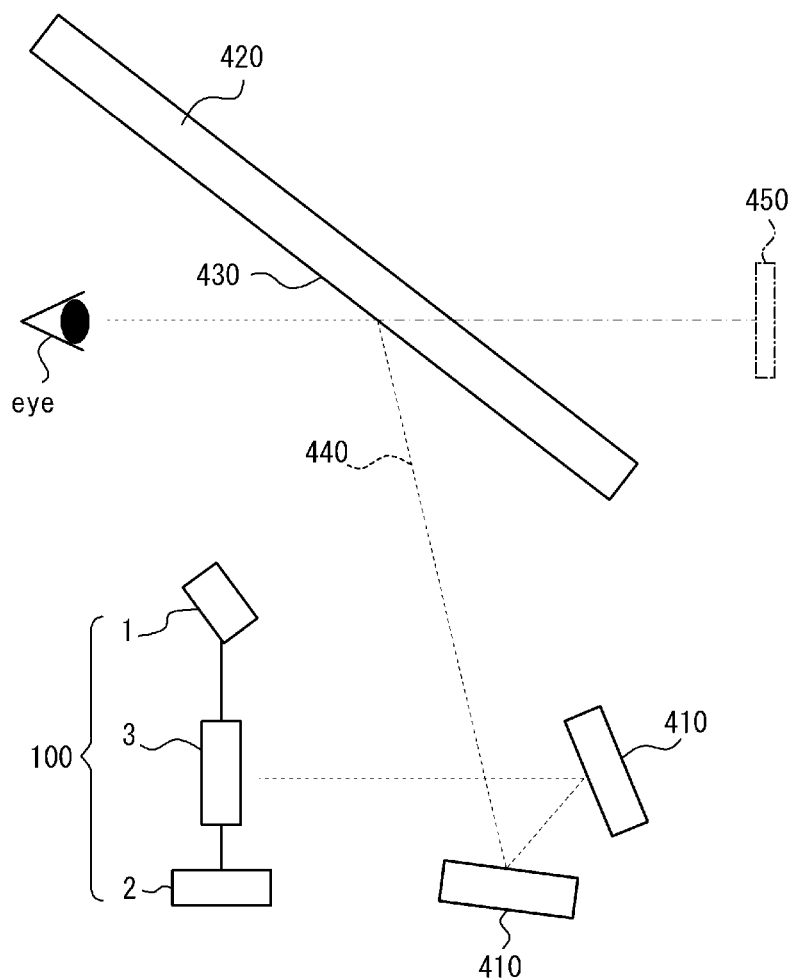

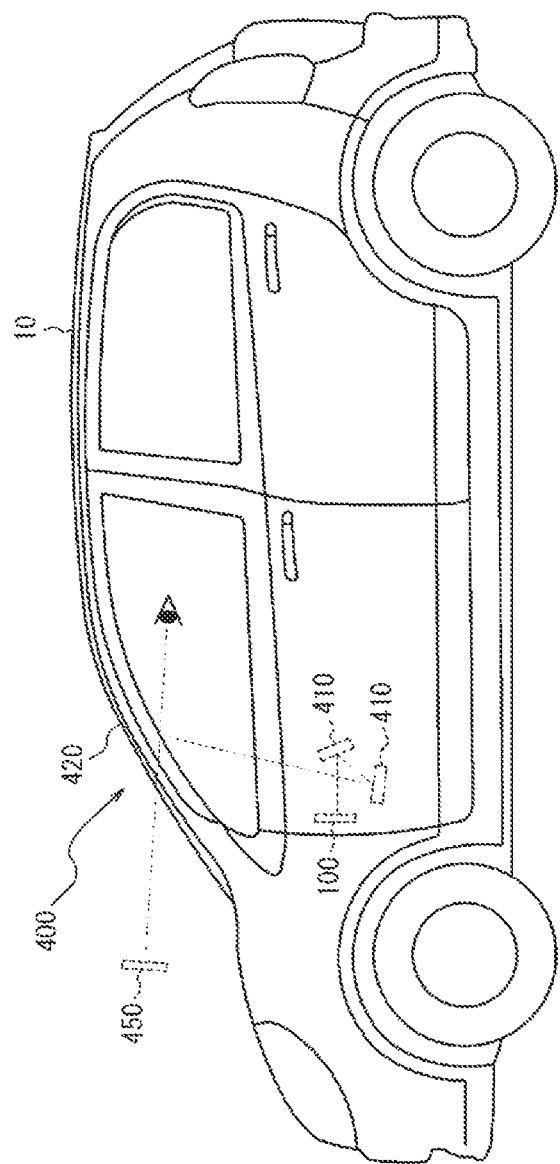
[Fig. 3]

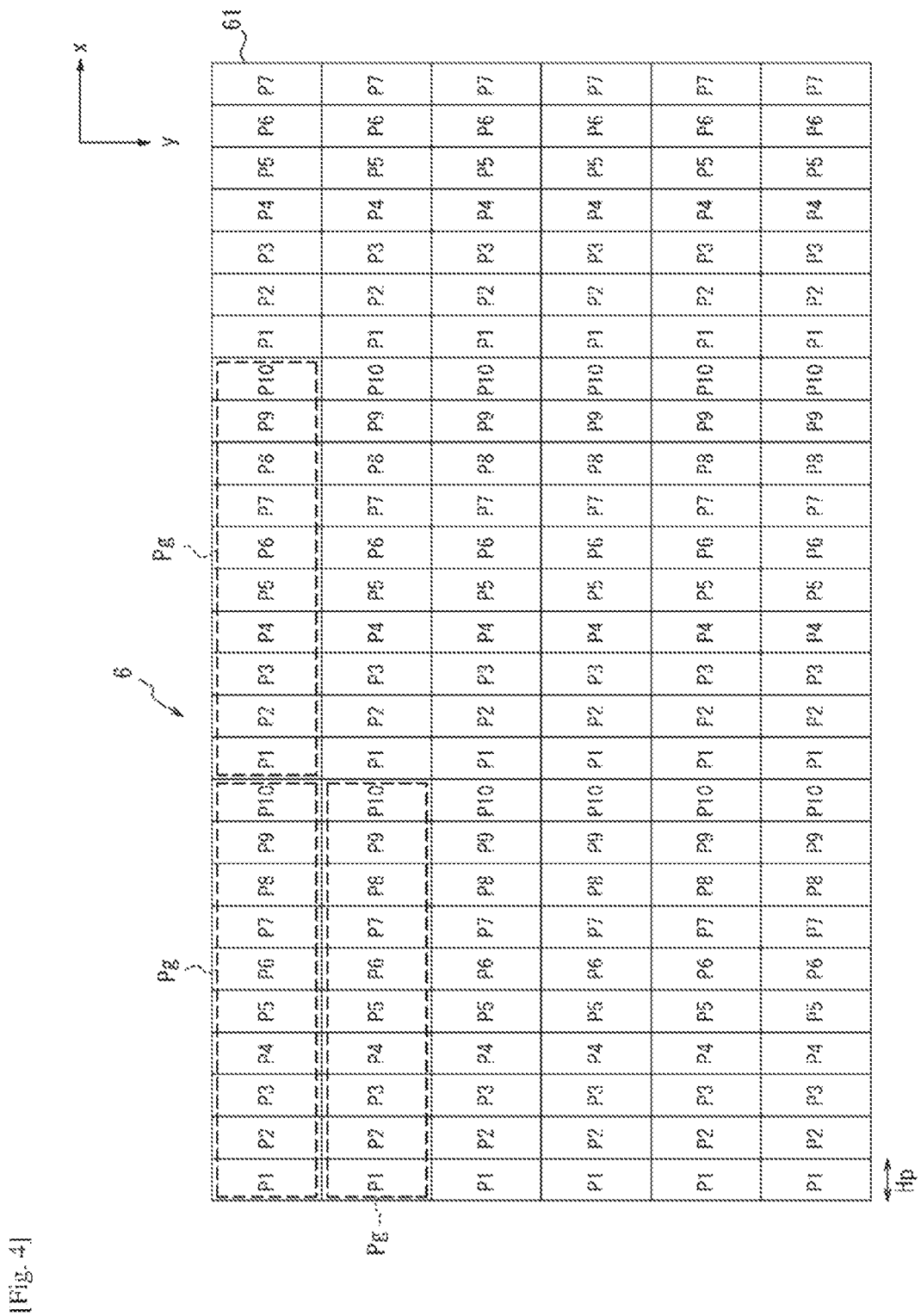

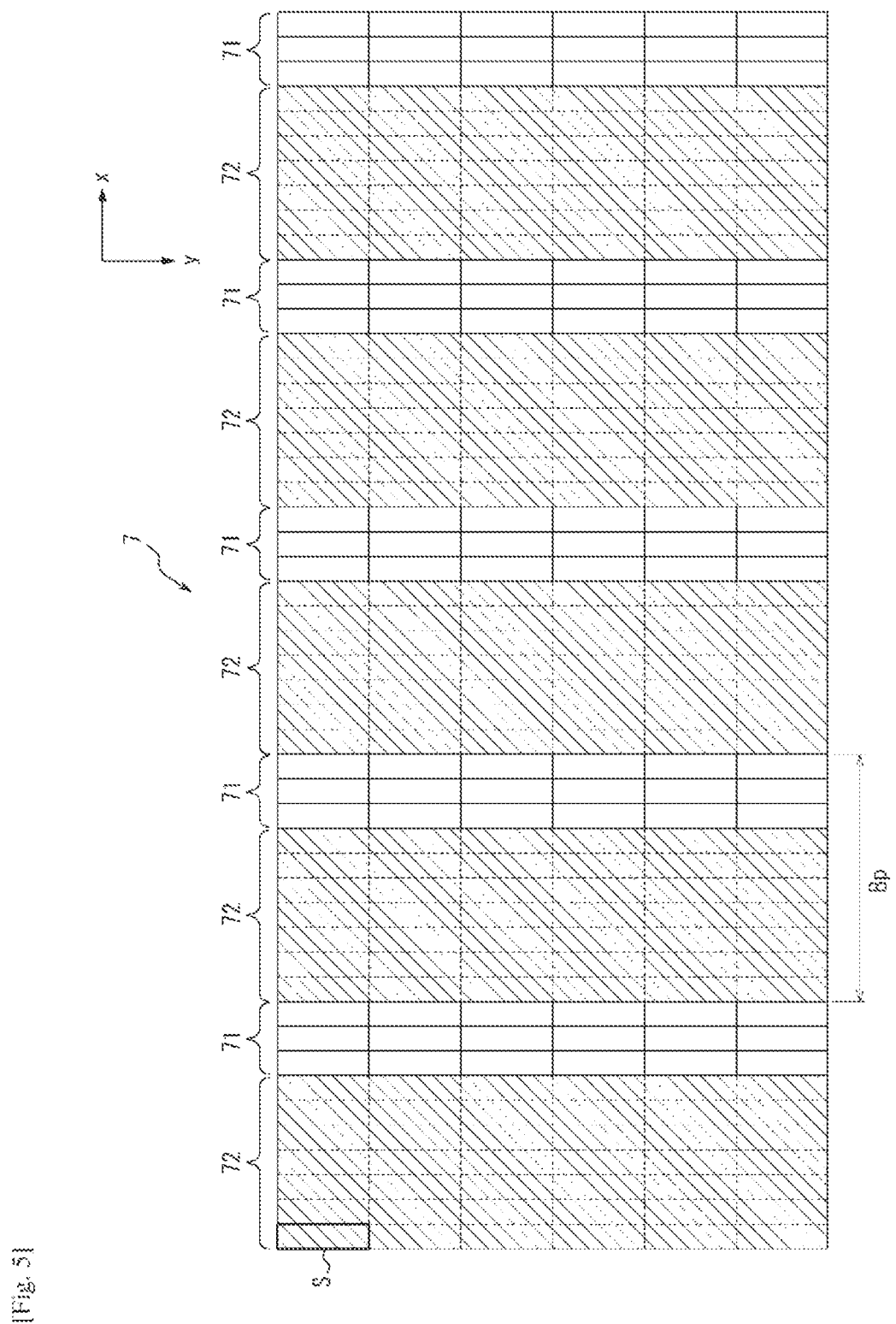

[Fig. 6]

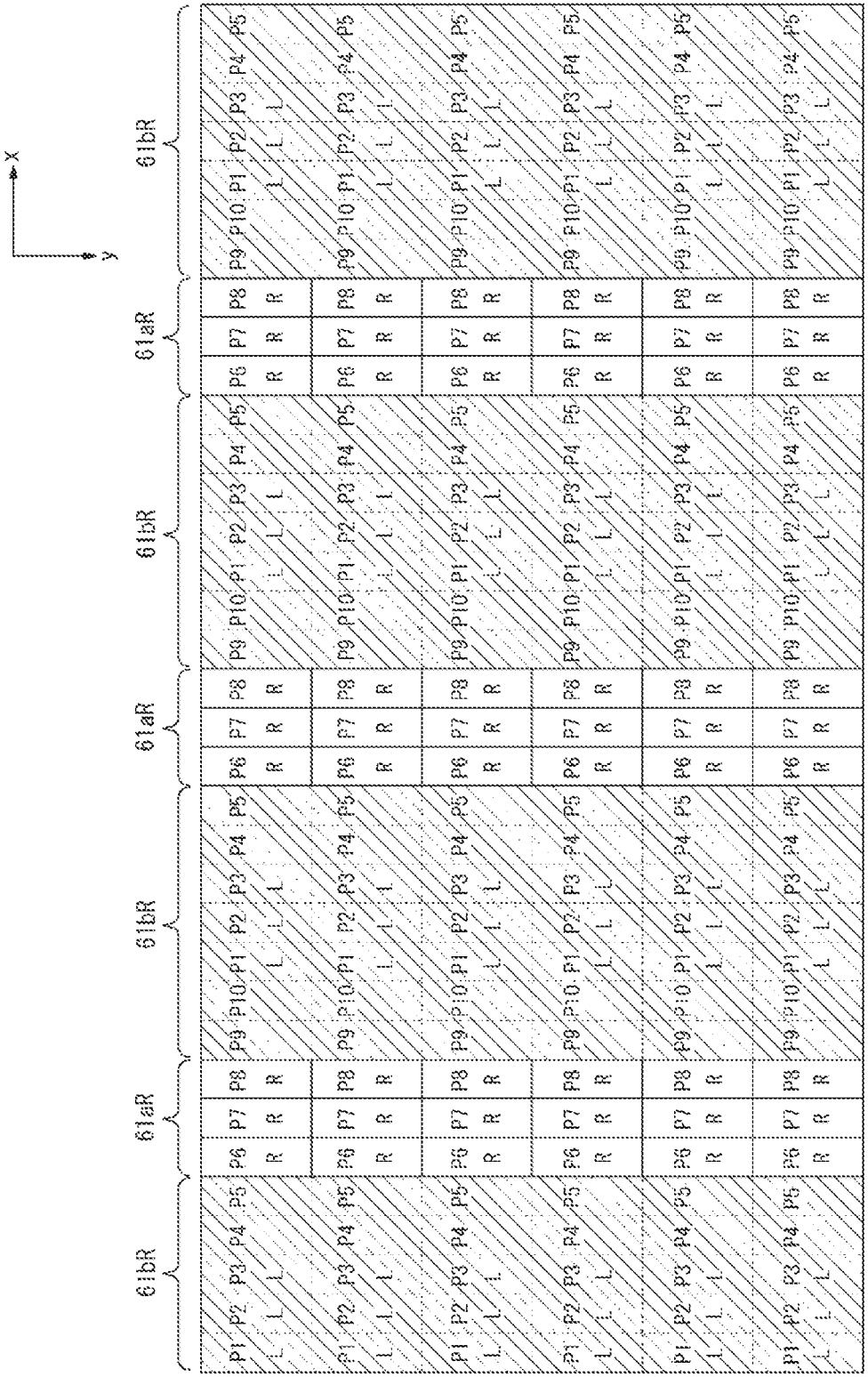

[Fig. 8]
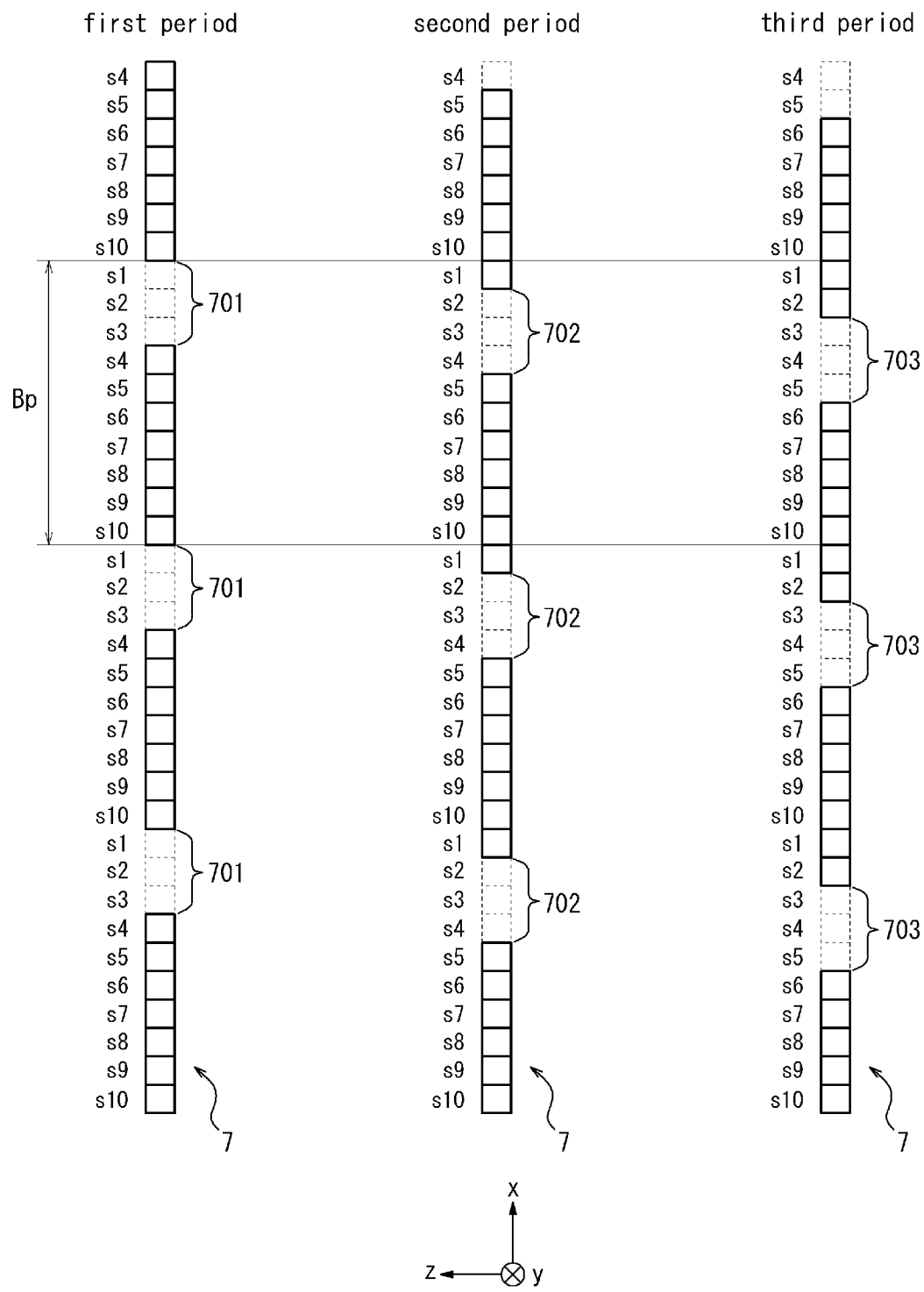

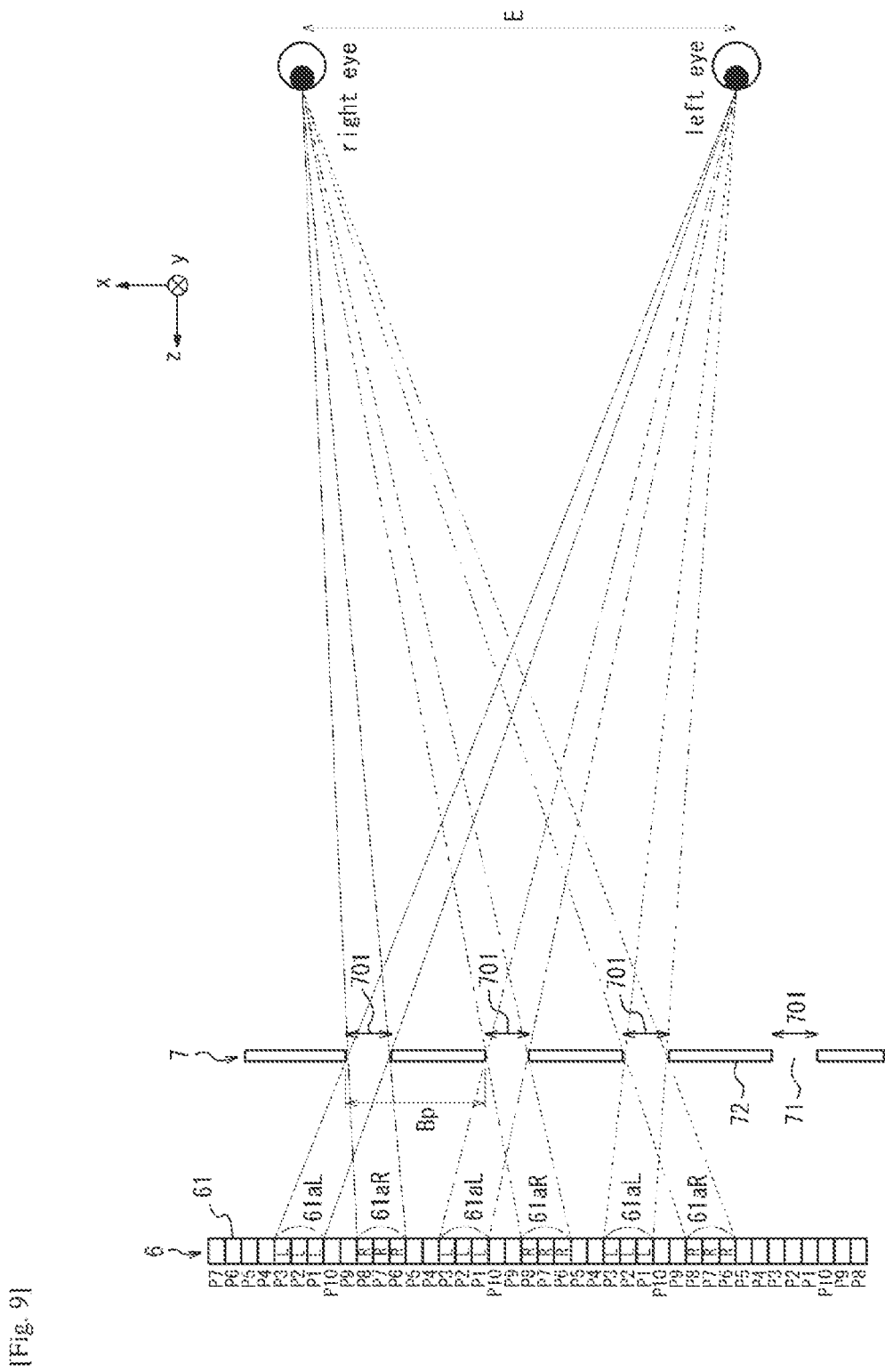
[Fig. 9]

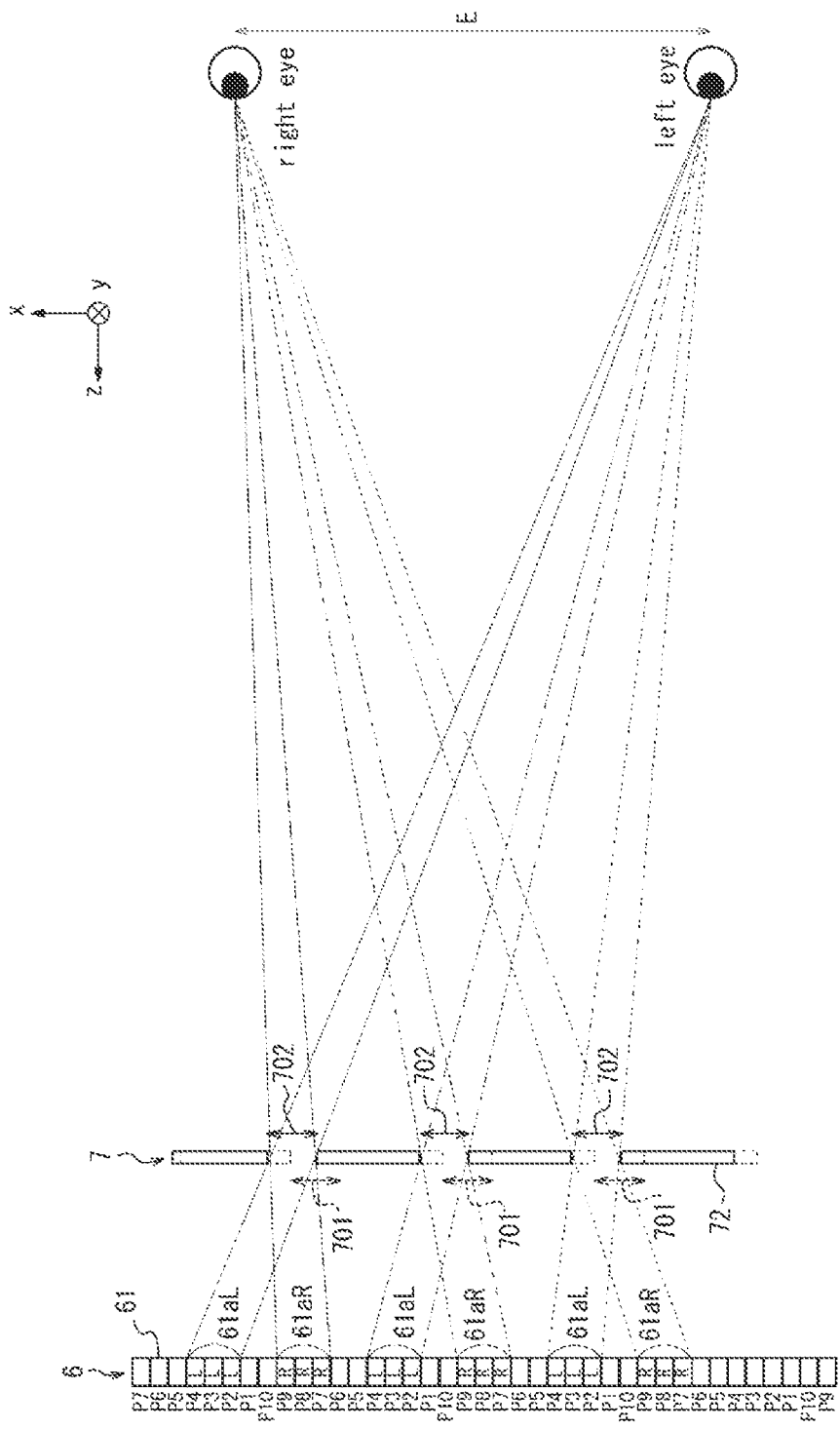
[Fig. 10]

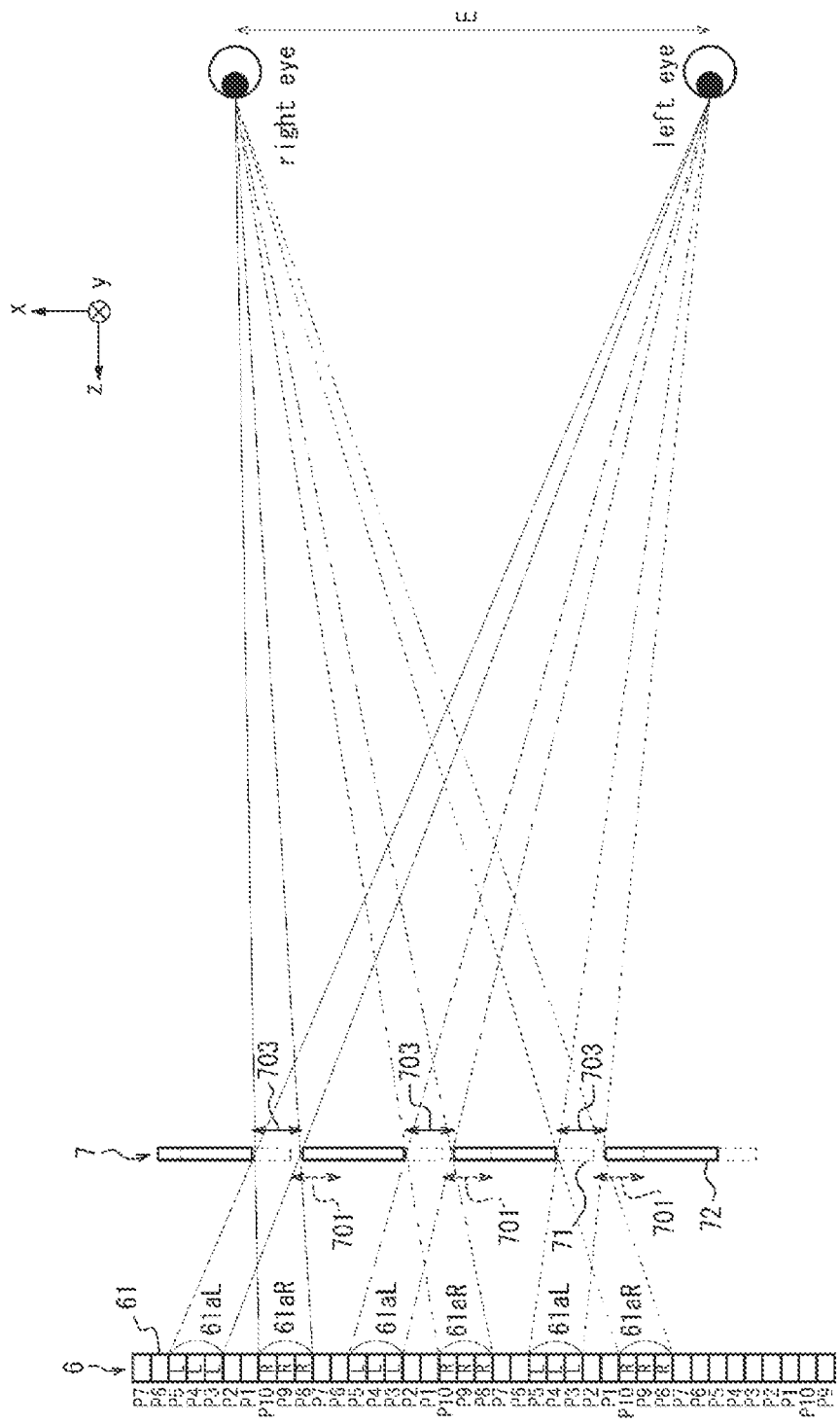
[Fig. 11]

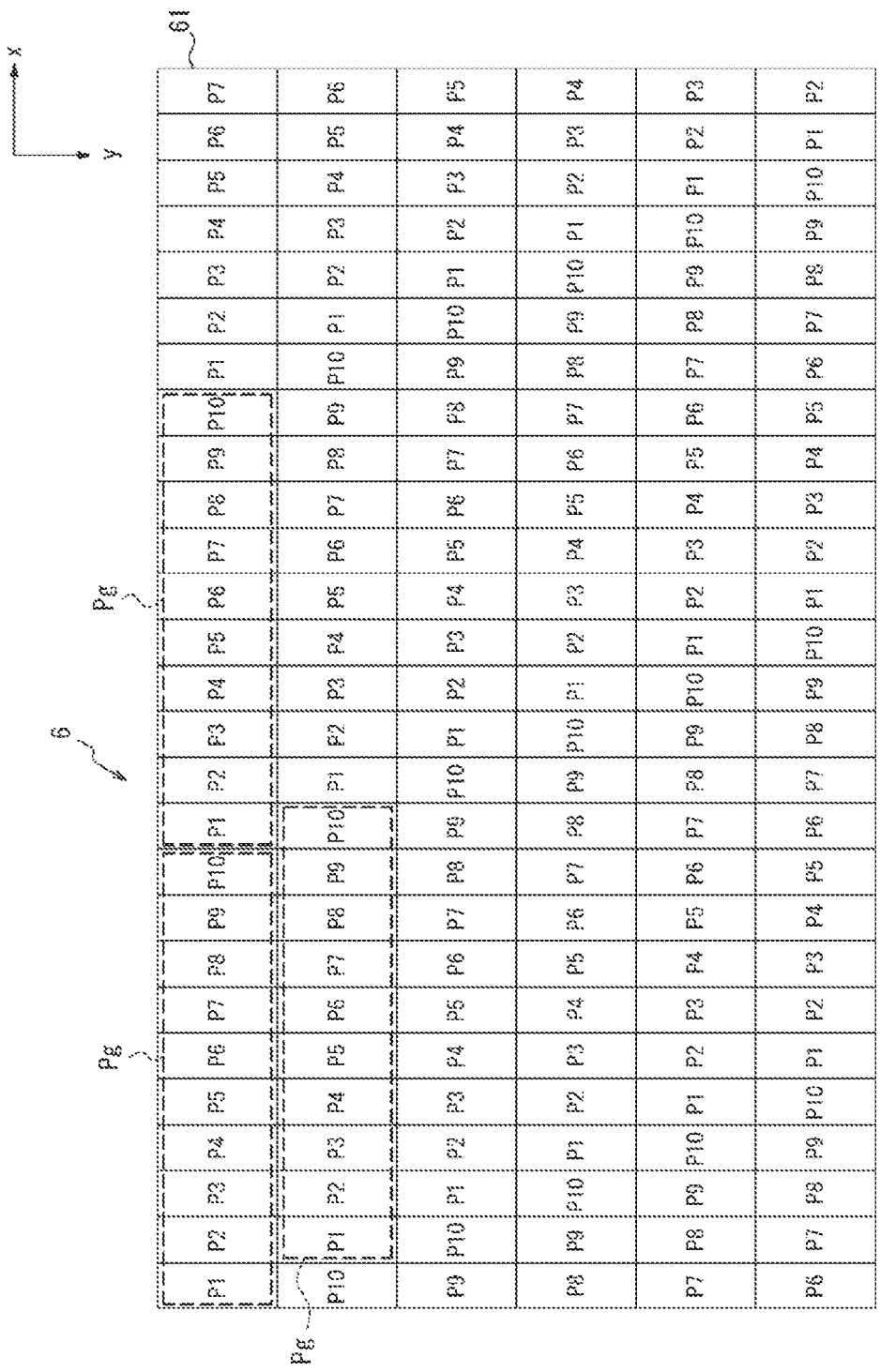
[Fig. 12]

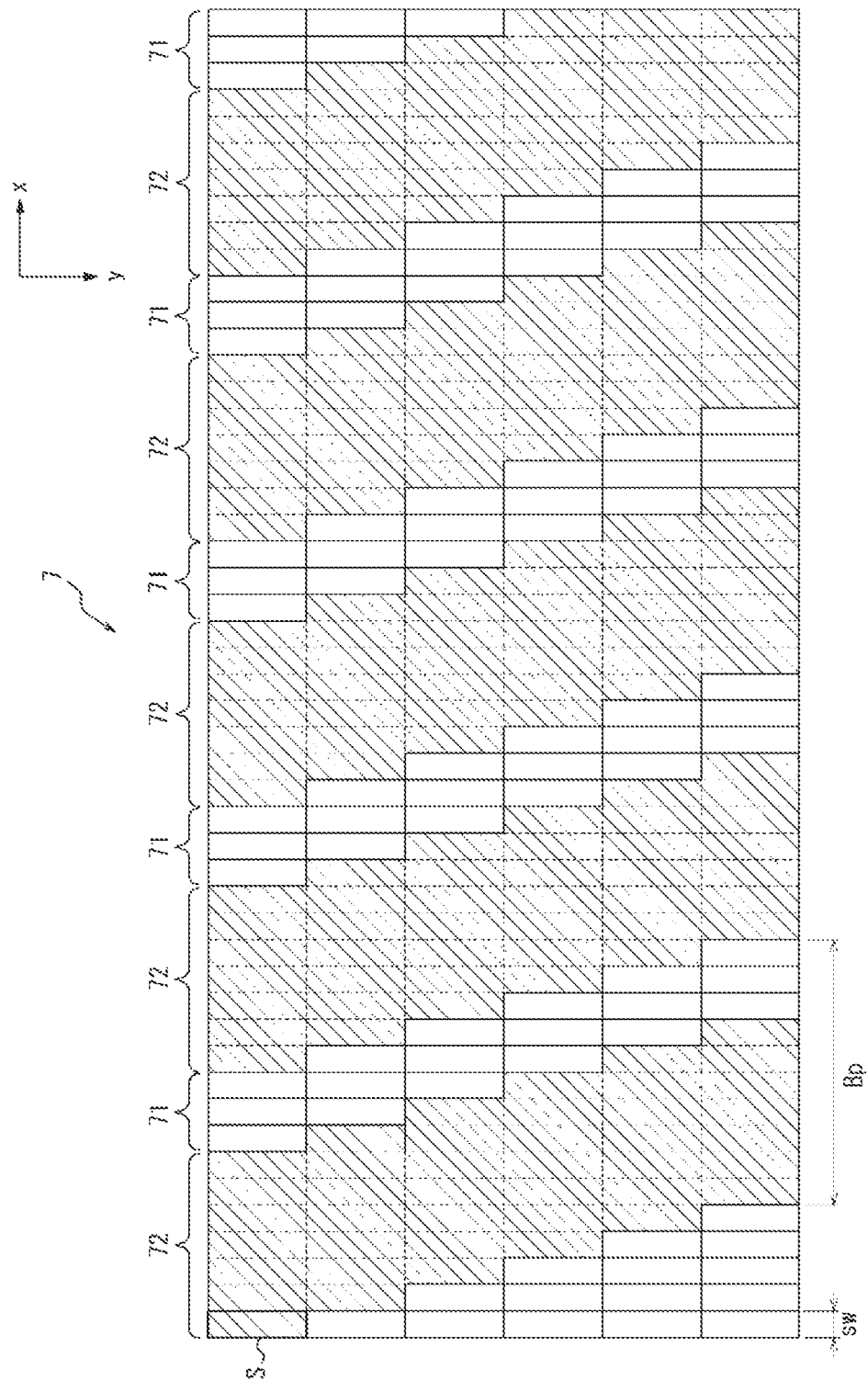
[Fig. 13]

THREE-DIMENSIONAL DISPLAY DEVICE, THREE-DIMENSIONAL DISPLAY SYSTEM, HEAD-UP DISPLAY SYSTEM, AND MOVABLE OBJECT

TECHNICAL FIELD

The present disclosure relates to a three-dimensional display device, a three-dimensional display system, a head-up display system, and a movable object.

CROSS REFERENCE TO RELATED APPLICATIONS

This application claims priority to and the benefit of Japanese Patent Applications No. 2018-149305 (filed on Aug. 8, 2018), the entire contents of which are incorporated herein by reference.

BACKGROUND ART

A known three-dimensional (3D) display device includes an optical element that directs a part of light from a display panel to reach a right eye, another part of the light from the display panel to reach a left eye (refer to Patent Literature 1).

CITATION LIST

Patent Literature

NPL 1: Patent Literature 1: Japanese Unexamined Patent Application Publication No. 2001-166259

SUMMARY OF INVENTION

The invention provides a three-dimensional display device according to claim 1, a three-dimensional display system according to claim 10, a head-up display system according to claim 14, and a movable object according to claim 15. Further embodiments are described in the dependent claims.

A three-dimensional display device according to a first aspect of the present disclosure includes a display panel, a shutter panel, and a controller. The display panel includes subpixels that display a parallax image including a first image and a second image having parallax between the images (i.e. between the first image and the second image). The shutter panel is configured to define a traveling direction of image light representing the parallax image from the display panel. The controller changes, in a certain time cycle (e.g. after every lapse of a time duration of the certain time cycle and/or with a frequency corresponding to the certain time cycle), areas on the shutter panel in a light transmissive state to transmit the image light with at least a certain transmittance and areas on the shutter panel in a light attenuating state to transmit the image light with a transmittance lower than the transmittance in the light transmissive state. The controller is configured to change the areas in the light transmissive state and the areas in the light attenuating state, and changes the subpixels to display the first image and the second image based on positions of the areas in the light transmissive state. E.g., the controller changes the areas in the light transmissive state and the areas in the light attenuating state, and changes the subpixels to display the first image and the second image based on new/changed positions of the areas in the light transmissive state. E.g., the controller changes the areas in the light transmissive state and the areas in the light attenuating state, and correspondingly changes the subpixels to display the first image and the second image. E.g., the controller changes the areas in the light transmissive state and the areas in the light attenuating state, and changes the subpixels to display the first image and the second image depending on a change of the areas in the light transmissive state and the areas in the light attenuating state.

According to a second aspect, in the three-dimensional display device according to the first aspect, the controller changes at least selected ones of the areas in the light transmissive state to the light attenuating state, and changes selected ones of the areas in the light attenuating state with the same total size as the at least selected ones of the areas (e.g., areas (to be) changed from the light transmissive state to the light attenuating state) to the light transmissive state.

According to a third aspect, in the three-dimensional display device according to the second aspect, the controller changes all the areas in the light transmissive state to the light attenuating state, and changes selected ones of the areas in the light attenuating state with the same total size as the areas in the light transmissive state (e.g., areas (to be) changed from the light transmissive state to the light attenuating state) to the light transmissive state.

According to a fourth aspect, in the three-dimensional display device according to any of the first aspect to the third aspect, the controller is configured to control the shutter panel to cause a difference in a duration for which each of the areas on the display panel is in the light transmissive state (e.g. in a state for displaying a parallax image to be transmitted through areas of the shutter panel in the light transmissive state) to fall within a certain range. E.g., in an exemplary embodiment, the certain range may be less or equal to 5%, e.g. less or equal to 4%, e.g. less or equal to 3%, e.g. less or equal to 2%, e.g. less or equal to 1%, e.g. respectively over an operation period of at least 30 minutes, e.g. at least 1 hour.

According to a fifth aspect, in the three-dimensional display device according to any of the first aspect to the fourth aspect, the controller changes the certain time cycle based on at least one of first information associated with performance degradation or a failure factor for the display panel and date and time information.

According to a sixth aspect, in the three-dimensional display device according to the second aspect, the controller determines a size of the at least selected ones of the areas to be changed from the light transmissive state to the light attenuating state based on at least one of the first information associated with performance degradation or a failure factor for the display panel and the date and time information.

According to a seventh aspect, in the three-dimensional display device according to any of the fifth aspect or the sixth aspect, the first information includes (e.g. includes one or more of) a temperature (e.g. a device temperature, e.g. a device temperature of the display panel), a movement direction, and at least one of a latitude and a longitude of the display panel, an air temperature and an illuminance around the display panel, and weather, and the date and time information includes a date and time.

A three-dimensional display system according to an eighth aspect of the present disclosure includes a position detection device and a three-dimensional display device. The position detection device is configured to detect a position of an eye of a user. The three-dimensional display device includes a display panel, a shutter panel, and a controller. The display panel includes subpixels that display a parallax image including a first image and a second image having parallax between the images. The shutter panel is configured to define a traveling direction of image light representing the parallax image from the display panel. The controller changes, in a certain time cycle, areas on the shutter panel in a light transmissive state to transmit the image light with at least a certain transmittance and areas on the shutter panel in a light attenuating state to transmit the image light with a transmittance lower than the transmittance in the light transmissive state. The controller changes the subpixels to display the first image and the second image based on positions of the areas in the light transmissive state.

A head-up display system according to a ninth aspect of the present disclosure includes a three-dimensional display device. The three-dimensional display device includes a display panel, a shutter panel, and a controller. The display panel includes subpixels that display a parallax image including a first image and a second image having parallax between the images. The shutter panel is configured to define a traveling direction of image light representing the parallax image from the display panel. The controller changes, in a certain time cycle, areas on the shutter panel in a light transmissive state to transmit the image light with at least a certain transmittance and areas on the shutter panel in a light attenuating state to transmit the image light with a transmittance lower than the transmittance in the light transmissive state. The controller changes the subpixels to display the first image and the second image based on positions of the areas in the light transmissive state.

A movable object according to a tenth aspect of the present disclosure includes a three-dimensional display device. The three-dimensional display device includes a display panel, a shutter panel, and a controller. The display panel includes subpixels that display a parallax image. The parallax image includes a first image and a second image. The first image and the second image have parallax each other. The shutter panel is configured to define a traveling direction of image light representing the parallax image from the display panel. The controller changes, in a certain time cycle, areas on the shutter panel in a light transmissive state to transmit the image light with at least a certain transmittance and areas on the shutter panel in a light attenuating state to transmit the image light with a transmittance lower than the transmittance in the light transmissive state. The controller changes the subpixels to display the first image and the second image based on positions of the areas in the light transmissive state.

Advantageous Effects of Invention

The structures according to the above aspects of the disclosure have less degradation caused by sunlight irradiation.

BRIEF DESCRIPTION OF DRAWINGS

FIG. 1 is a schematic diagram of a 3D display system viewed from above according to an embodiment.

FIG. 2 is a diagram of an example head-up display (HUD) incorporating the 3D display system shown in FIG. 1.

FIG. 3 is a diagram of an example movable object incorporating the HUD shown in FIG. 2.

FIG. 4 is a diagram showing an example display panel shown in FIG. 1 viewed in a depth direction.

FIG. 5 is a diagram showing an example shutter panel shown in FIG. 1 viewed in the depth direction.

FIG. 6 is a diagram describing left viewable areas on the display panel shown in FIG. 1.

FIG. 7 is a diagram describing right viewable areas on the display panel shown in FIG. 1.

FIG. 8 is a diagram describing the shutter panel in a first period, a second period, and a third period.

FIG. 9 is a diagram describing the left viewable areas and the right viewable areas when first areas on the shutter panel shown in FIG. 1 are in a light transmissive state.

FIG. 10 is a diagram describing the left viewable areas and the right viewable areas when second areas on the shutter panel shown in FIG. 1 are in the light transmissive state.

FIG. 11 is a diagram describing the left viewable areas and the right viewable areas when third areas on the shutter panel shown in FIG. 1 are in the light transmissive state.

FIG. 12 is a diagram of a display panel according to a modification of the panel shown in FIG. 1 viewed in a depth direction.

FIG. 13 is a diagram of the shutter panel according to the modification of the panel shown in FIG. 1 viewed in a depth direction.

DESCRIPTION OF EMBODIMENTS

Such 3D display devices are intended to have less degradation caused by sunlight irradiation.

One or more aspects of the present disclosure are directed to a three-dimensional display device, a three-dimensional display system, a head-up display system, and a movable object that have less degradation caused by sunlight irradiation.

Embodiments of the present disclosure will now be described with reference to the drawings.

As shown in FIG. 1, a three-dimensional (3D) display system 100 according to an embodiment of the present disclosure includes a position detection device 1, an information detection device 2, and a 3D display device 3.

As shown in FIG. 2, the 3D display system 100 may be included in a head-up display system 400. The head-up display system 400 is also referred to as an HUD 400. The HUD 400 includes the 3D display system 100, an optical member 410, and a projection reception member 420, which includes a projection screen 430. The HUD 400 is configured to direct image light from the 3D display system 100 to reach the projection reception member 420 through the optical member 410. The HUD 400 is configured to direct image light reflected on the projection reception member 420 to reach the left and right eyes of a user. In other words, the HUD 400 is configured to direct the light to travel from the 3D display system 100 to the user's left and right eyes along an optical path 440 indicated by a broken line in FIG. 2. The user visually perceives image light reaching the eyes along the optical path 440 as a virtual image 450.

As shown in FIG. 3, the HUD 400, which includes the 3D display system 100, may be mounted on a movable object 10. The HUD 400 may include components that also serve as other devices or components included in the movable object 10. For example, the movable object 10 may use a windshield as the projection reception member 420. The HUD 400 and the 3D display system 100 may be mounted on the movable object 10. The movable object according to the present disclosure includes a vehicle, a vessel, and an aircraft. The vehicle according to the present disclosure includes, but is not limited to, an automobile and an industrial vehicle, and may also include a railroad vehicle, a community vehicle, and a fixed-wing aircraft traveling on a runway. The automobile includes, but is not limited to, a passenger vehicle, a truck, a bus, a motorcycle, and a trolley bus, and may also include other vehicles traveling on a road. The industrial vehicle includes an agricultural vehicle and a construction vehicle. The industrial vehicle includes, but is not limited to, a forklift and a golf cart. The agricultural vehicle includes, but is not limited to, a tractor, a cultivator, a transplanter, a binder, a combine, and a lawn mower. The construction vehicle includes, but is not limited to, a bulldozer, a scraper, a power shovel, a crane vehicle, a dump truck, and a road roller. The vehicle includes man-powered vehicles. The classification of the vehicle is not limited to the above. For example, the automobile may include an industrial vehicle travelling on a road, and one type of vehicle may fall within classes. The vessel according to the present disclosure includes a jet ski, a boat, and a tanker. The aircraft according to the present disclosure include a fixed-wing aircraft and a rotary-wing aircraft.

Referring now to FIG. 1, the position detection device 1 is configured to detect the positions of the user's left eye (first eye) and right eye (second eye), and is configured to output the positions to the 3D display device 3. The position detection device 1 may include a camera. The position detection device 1 may capture an image of the user's face with the camera. The position detection device 1 may use the image including the user's face captured with the camera to detect the positions of the left and right eyes. The position detection device 1 may use an image captured with a single camera to detect the positions of the left and right eyes as coordinates in a 3D space. The position detection device 1 may use images captured with two or more cameras to detect the positions of the left and right eyes as coordinates in a 3D space.

The position detection device 1 may include no camera, and may be connected to an external camera. The position detection device 1 may include an input terminal for receiving signals from the external camera. The external camera may be connected to the input terminal directly. The external camera may be connected to the input terminal indirectly through a shared network. The position detection device 1, which includes no camera, may include the input terminal for receiving image signals from the camera. The position detection device 1, which includes no camera, may use the image signals received through the input terminal to detect the positions of the left and right eyes.

The position detection device 1 may include a sensor. The sensor may be an ultrasonic sensor or an optical sensor. The position detection device 1 may be configured to detect the position of the user's head with the sensor, and the positions of the left and right eyes based on the position of the head. The position detection device 1 may use one sensor or two or more sensors to detect the positions of the left and right eyes as coordinates in a 3D space.

The 3D display system 100 may not include the position detection device 1. When the 3D display system 100 does not include the position detection device 1, the 3D display device 3 may include an input terminal for receiving signals from an external detection device. The external detection device may be connected to the input terminal. The external detection device may use electrical signals or optical signals as transmission signals transmitted to the input terminal. The external detection device may be connected to the input terminal indirectly through a shared network. The 3D display device 3 may receive positional coordinates indicating the positions of the left and right eyes input from the external detection device.

The information detection device 2 is configured to detect first information. The first information is associated with performance degradation or failure factors for a display panel 6. The first information includes, for example, the temperature, the movement direction, and at least either the latitude or longitude of the display panel 6, as well as the air temperature and the illuminance around the display panel 6, and the weather. The information detection device 2 includes one or more components selected from following sensors. These sensors include a device temperature sensor 21, an outside air temperature sensor 22, an illuminance sensor 23, a weather information detector 24, a position detector 25, and a direction sensor 26. The display panel 6 may be surrounded by an area adjacent to the 3D display device 3. The display panel 6 may be surrounded by an area defined within a certain distance from the 3D display device 3. The area within the certain distance may be an area outside the display panel 6 that is likely to be under substantially the same temperature, illuminance, and weather as the display panel 6. The display panel 6, which is mounted on the movable object 10, may be surrounded by an area inside the movable object 10.

The device temperature sensor 21 is configured to detect the temperature of the display panel 6. The device temperature sensor 21 is configured to output the detected temperature to the 3D display device 3.

The outside air temperature sensor 22 is configured to detect the air temperature around the display panel 6. The outside air temperature sensor 22 is configured to output the detected air temperature to the 3D display device 3.

The illuminance sensor 23 is configured to detect an illuminance around the display panel 6. With the 3D display device 3 mounted on the movable object 10, for example, the illuminance sensor 23 is configured to detect the illuminance around the display panel 6 reachable by sunlight that is reflected on the windshield of the movable object 10. The illuminance sensor 23 is configured to output the detected illuminance to the 3D display device 3.

The weather information detector 24 is configured to detect weather information by receiving the information with an external device through a communication network. The weather information is configured to indicate the weather conditions or the weather at the location of the display panel 6. The weather information includes, for example, sunny weather, rainy weather, and cloudy weather. The weather information detector 24 is configured to output the detected weather information to the 3D display device 3.

The position detector 25 is configured to detect the position of the information detection device 2 including the position detector 25. The information detection device 2 may be immovable relative to the 3D display device 3. Thus, the position detector 25 may detect the position of the 3D display device 3 by detecting the position of the information detection device 2. The position detector 25 may include a receiver for a global navigation satellite system (GNSS). The position detector 25 is configured to detect its position based on signals transmitted from satellites and received by the GNSS receiver. The GNSS includes satellite navigation systems such as the Global Positioning System (GPS), the Global Navigation Satellite System (GLONASS), Galileo, or the Quasi-Zenith Satellite System. The position detector 25 is configured to detect the position of the 3D display device 3, and then outputs the detected position to the 3D display device 3.

The direction sensor 26 is configured to detect the direction in which the display panel 6 moves. The direction sensor 26 is configured to output the detected direction to the 3D display device 3.

The 3D display device 3 includes an obtaining unit 4, an illuminator 5, the display panel 6, a shutter panel 7 as an optical element, and a controller 8.

The obtaining unit 4 may be configured to obtain the positions of the user's eyes detected by the position detection device 1. The obtaining unit 4 may be configured to obtain the first information detected by the information detection device 2. When the 3D display device 3 is mounted on the movable object 10, the obtaining unit 4 may receive information from an engine control unit or an electric control unit (ECU) of the movable object 10. The information, which is received by the obtaining unit 4 from the ECU, may include lighting information indicating whether the headlights of the movable object 10 are turned on. The headlights may be configured to turn on and off based on the illuminance detected by the illuminance sensor included in the movable object 10. More specifically, the headlights may be configured to turn on when the illuminance is below a threshold, and turn off when the illuminance is equal to or greater than the threshold. The movable object 10 thus receives sunlight with lower illuminance near the display panel 6 mounted on the movable object 10 when the headlights are turned on than when the headlights are turned off. The obtaining unit 4 can obtain the range of illuminance levels near the display panel 6 based on the lighting information for the headlights.

The illuminator 5 can illuminate a surface of the display panel 6. The illuminator 5 may include a light source, a light guide plate, a diffuser plate, and a diffusion sheet. The illuminator 5 is configured to emit illumination light using the light source, and spread the illumination light uniformly for illuminating the surface of the display panel 6 using its component including the light guide plate, the diffuser plate, and the diffusion sheet. The illuminator 5 can emit the uniform light toward the display panel 6.

The display panel 6 may be a transmissive liquid crystal display panel. The display panel 6 is not limited to a transmissive liquid crystal display panel but may be another display panel such as an organic electroluminescent (EL) display. When the display panel 6 is a self-luminous display panel, the 3D display device 3 may not include the illuminator 5. The display panel 6 that is a liquid crystal panel will now be described. As shown in FIG. 4, the display panel 6 includes a two-dimensional active area 61 including multiple divisional areas. The active area 61 is configured to display a parallax image. The parallax image includes a left eye image (first image) and a right eye image (second image). The right eye image has parallax with respect to the left eye image (described later). The divisional areas are defined in a lattice-like black matrix in a first direction and in a second direction perpendicular to the first direction. A direction perpendicular to the first and second directions is referred to as a third direction. The first direction may be referred to as a horizontal direction. The second direction may be referred to as a vertical direction. The third direction may be referred to as a depth direction. However, the first, second, and third directions are not limited to the directions referred to above. In the drawings, the first direction is expressed as x-direction, the second direction is expressed as y-direction, and the third direction is expressed as z-direction.

Each divisional area corresponds to a subpixel. Thus, the active area 61 includes multiple subpixels arranged in a lattice in the horizontal and vertical directions.

Each subpixel corresponds to one of red (R), green (G), and blue (B). A set of three subpixels colored R, G, and B forms a pixel. A pixel may be referred to as a picture element. For example, multiple subpixels forming individual pixels are arranged in the horizontal direction. For example, subpixels having the same color are arranged in the vertical direction.

As described above, multiple subpixels arranged in the active area 61 form subpixel groups Pg. The subpixel groups Pg may include multiple subpixels from multiple pixels. The subpixel groups Pg are repeatedly arranged in the horizontal direction. The subpixel groups Pg are also repeatedly arranged in the vertical direction. The subpixel groups Pg each include subpixels in certain rows and columns. More specifically, the subpixel groups Pg each include (2×n×b) subpixels P1 to P(2×n×b), which are continuously arranged in b row(s) in the vertical direction and in 2×n columns in the horizontal direction. In the example shown in FIG. 4, n is 5, and b is 1. The active area 61 includes the subpixel groups Pg each including ten continuous subpixels P1 to P10 arranged in one row in the vertical direction and in ten columns in the horizontal direction. In the example shown in FIG. 4, some of the subpixel groups Pg are denoted by reference signs.

Each subpixel group Pg is the smallest unit to be controlled by the controller 8 (described later) to display an image. The subpixels P1 to P(2×n×b) included in each subpixel group Pg with the same identification information are controlled by the controller 8 at the same time. For example, the controller 8 can cause the subpixels P1 in all the subpixel groups Pg displaying the left eye image to display the right eye image at the same time when switching the image to be displayed by the subpixels P1 from the left eye image to the right eye image.

As shown in FIG. 1, the shutter panel 7 is planar along the active area 61, and arranged at a certain distance (gap) g from the active area 61. The shutter panel 7 may be arranged opposite to the illuminator 5 from the display panel 6. The shutter panel 7 may be arranged on the side of the display panel 6 adjacent to the illuminator 5.

The shutter panel 7 includes a liquid crystal shutter. As shown in FIG. 5, the shutter panel 7 includes multiple shutter areas s arranged in a lattice in the horizontal and vertical directions. Each shutter area s has a light transmittance controllable by changing a voltage applied as controlled by the controller 8. The controller 8 is configured to control selected ones of the multiple shutter areas s into a light transmissive state, and the remaining shutter areas s into a light attenuating state. Thus, as shown in FIG. 5, the shutter panel 7 can have areas in the light transmissive state that serve as light transmissive areas 71, and the remaining areas in the light attenuating state that serve as light attenuating areas 72. The light transmissive areas 71 may be configured to transmit light with a transmittance of a first certain value or greater. The first certain value is greater than a second certain value (described later). The light attenuating areas 72 may be configured to transmit light with a transmittance of the second certain value or smaller. For example, the light attenuating areas 72 may be configured to block light incident on the shutter panel 7, and may be configured to transmit substantially no light. The ratio of the second certain value to the first certain value is to be minimized. The ratio of the second certain value to the first certain value may be 1/100 in one example. The ratio of the second certain value to the first certain value may be 1/1000 in another example.

The light transmissive areas 71 and the light attenuating areas 72 extend in the vertical direction. The light transmissive areas 71 and the light attenuating areas 72 are arranged repeatedly alternately in the horizontal direction. Thus, as shown in FIG. 1, the shutter panel 7 is configured to define the traveling direction of image light from the subpixels. The shutter panel 7 is configured to define the traveling direction of image light from the subpixels to define the areas in the active area 61 viewable by the user's eyes. The areas in the active area 61, which is emitting image light reaching the position of the user's left eye, are hereafter referred to as left viewable areas 61$a$L (first viewable areas). The areas in the active area 61, which is emitting image light reaching the position of the user's right eye, are referred to as right viewable areas 61$a$R (second viewable areas).

As shown in FIG. 1, a barrier pitch Bp and the gap g are determined to satisfy the formula (1) and the formula (2). The barrier pitch Bp is an interval used for arranging the light transmissive areas 71 in the horizontal direction. The gap g is a gap between the active area 61 and the shutter panel 7. Those formulas (1) and (2) use an optimum viewing distance d and an interocular distance E described below.

$$E:d=(n \times Hp):g \quad \text{formula (1)}$$

$$d:Bp=(d+g):(2 \times n \times Hp) \quad \text{formula (2)}$$

The optimum viewing distance d refers to a distance between the user's right eye or left eye and the shutter panel 7. The direction of a straight line passing through the right eye and the left eye (interocular direction) corresponds to the horizontal direction. The interocular distance E is a distance between the user's right eye and left eye. The interocular distance E may be, for example, a distance of 61.1 to 64.4 mm, which has been calculated through studies performed by the National Institute of Advanced Industrial Science and Technology. Hp is the horizontal length of a subpixel as shown in FIG. 4.

Figure 6:
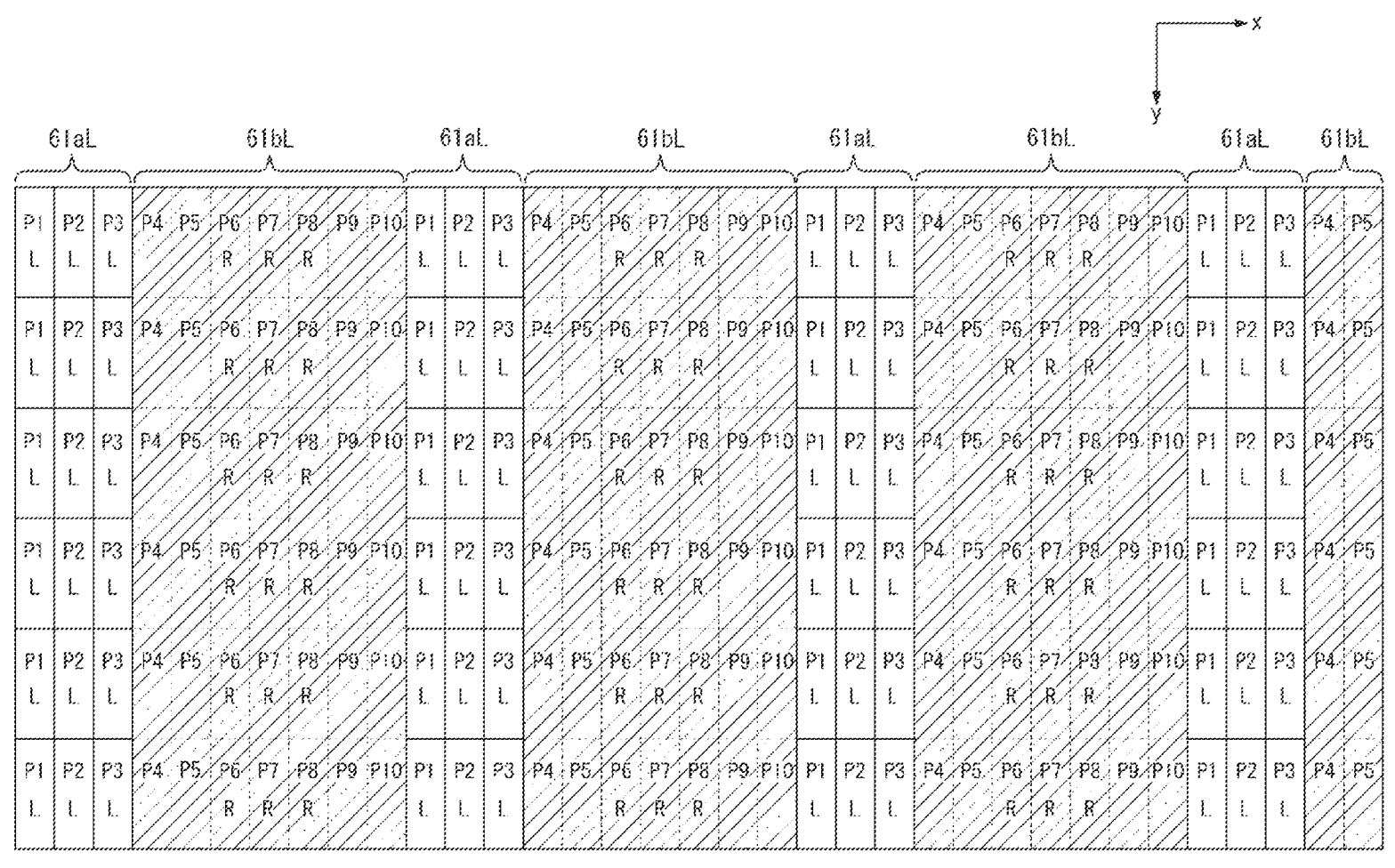

In this structure, the shutter panel 7 is configured to transmit image light from selected subpixels in the active area 61 through the light transmissive areas 71 to reach the user's left eye. The shutter panel 7 is configured to transmit image light from other subpixels through the light transmissive areas 71 to reach the user's right eye. An image viewable to the user when the image light reaches each of the user's left and right eyes will now be described in detail with reference to FIGS. 6 and 7. In FIGS. 6 and 7, subpixels to show the left eye image are each given reference sign L, and subpixels to show the right eye image are each given reference sign R.

As described above, the left viewable areas 61$a$L in FIG. 6 are defined on the active area 61 that are viewable by the user's left eye when image light transmitted through the light transmissive areas 71 on the shutter panel 7 reaches the user's left eye. Left unviewable areas 61$b$L are unviewable by the user's left eye when image light is blocked by the light attenuating areas 72 on the shutter panel 7. In the example shown in FIG. 6, the left viewable areas 61$a$L each include the subpixels P1 to P3. The left unviewable areas 61$b$L each include the subpixels P4 to P10.

The right viewable areas 61$a$R in FIG. 7 are defined on the active area 61 that are viewable by the user's right eye when image light from other subpixels transmitted through the light transmissive areas 71 on the shutter panel 7 reaches the user's right eye. Right unviewable areas 61$b$R are unviewable by the user's right eye when image light is blocked by the light attenuating areas 72 on the shutter panel 7. In the example shown in FIG. 7, the right viewable areas 61$a$R each include the subpixels P6 to P8. The right unviewable areas 61$b$R each include the subpixels P1 to P5, P9, and P10.

Thus, the left eye views the left eye image, and the right eye views the right eye image. As described above, the right eye image and the left eye image are having parallax between the images. Thus, the user views a 3D image.

The controller 8 may be connected to each of the components of the 3D display system 100, and be configured to control these components. The components controlled by the controller 8 include the position detection device 1 and the display panel 6. The controller 8 may be, for example, a processor. The controller 8 may include one or more processors. The processors may include a general-purpose processor that reads a specific program, and performs a specific function, or a processor dedicated to specific processing. The dedicated processor may include an application specific integrated circuit (ASIC). The processor may include a programmable logic device (PLD). The PLD may include a field-programmable gate array (FPGA). The controller 8 may either be a system on a chip (SoC) or a system in a package (SiP) in which one or more processors cooperate with other components. The controller 8 may include a storage unit, and store various items of information or programs to operate each component of the 3D display system 100. The storage unit may be, for example, a semiconductor memory. The storage unit may serve as a work memory for the controller 8.

The controller 8 is configured to control the shutter panel 7. More specifically, the controller 8 is configured to control the shutter panel 7 to arrange the light transmissive areas 71 and the light attenuating areas 72. More specifically, the controller 8 is configured to control the shutter panel 7 to arrange the light transmissive areas 71 and the light attenuating areas 72 alternately in the horizontal direction. The controller 8 may be configured to change the light transmissive areas 71 and the light attenuating areas 72 on the shutter panel 7 in every certain time cycle. The certain time cycle is, for example, a period for which continuous irradiation with sunlight is to be avoided in a specific part of the display panel 6. The cycle is determined through, for example, an experiment. The certain time cycle may be 10 seconds, 30 seconds, or a minute.

As shown in FIG. 8, for example, the controller 8 is configured to control first areas 701 on the shutter panel 7 into the light transmissive state during a first period included in the certain time cycle. The controller 8 is configured to control areas on the shutter panel 7 other than the first areas 701 into the light attenuating state during the first period. In FIG. 8, the shutter areas s1 to s10 are arranged in the horizontal direction, shutter areas s in the light transmissive state are indicated by broken lines, and shutter areas s in the light attenuating state are indicated by solid lines. The first areas 701 each have a length of 50% or less of the barrier pitch Bp in the horizontal direction. In the example shown in FIG. 8, the first areas 701 each have a length of 30% of the barrier pitch Bp in the horizontal direction.

The controller 8 is configured to control the first areas 701 on the shutter panel 7 into the light transmissive state, and is configured to control the parallax image to be displayed on the display panel 6 as shown in FIG. 9 based on the positions of the user's eyes detected by the position detection device 1. More specifically, the controller 8 is configured to cause selected subpixels to display the left eye image emitting image light reaching the position of the user's left eye through the first areas 701 in the light transmissive state. For example, the controller 8 is configured to cause at least a certain proportion of subpixels to display the left eye image emitting image light reaching the position of the left eye. The certain proportion may be, for example, 50%. Similarly, the controller 8 is configured to control the first areas 701 on the shutter panel 7 into the light transmissive state. The controller 8 is configured to cause selected subpixels to display the right eye image emitting image light reaching the position of the user's right eye through the light transmissive areas 71. For example, the controller 8 is configured to cause at least the certain proportion of subpixels to display the right eye image emitting image light reaching the position of the right eye.

In the example shown in FIG. 9, the controller 8 is configured to cause the subpixels P1 to P3 included in each subpixel group Pg to display the left eye image. The controller 8 is configured to cause the subpixels P6 to P8 included in each subpixel group Pg to display the right eye image.

As shown in FIG. 8, the controller 8 is configured to control second areas 702 on the shutter panel 7 into the light transmissive state during a second period. The controller 8 is configured to control areas on the shutter panel 7 other than the second areas 702 into the light attenuating state during the second period. The second areas 702 are areas different (e.g. at least partially different) from the first areas 701. The second areas 702 may include parts of the first areas 701. The second areas 702 may have the same horizontal length as the first areas 701. For example, the controller 8 may cause the outermost shutter area s1 included in the shutter areas s forming the first areas 701 to change from the light transmissive state to the light attenuating state. In this case, the controller 8 may cause the shutter area s4 adjacent to the outermost shutter area s3 opposite to the shutter area s1 included in the shutter areas s forming the first areas 701 to change from the light attenuating state to the light transmissive state.

The controller 8 is configured to control the second areas 702 on the shutter panel 7 into the light transmissive state, and is configured to control the parallax image to be displayed on the display panel 6 as shown in FIG. 10 based on the positions of the user's eyes detected by the position detection device 1. More specifically, the controller 8 is configured to cause selected subpixels to display the left eye image emitting image light reaching the position of the user's left eye through the second areas 702 in the light transmissive state. For example, the controller 8 is configured to cause at least a certain proportion of subpixels to display the left eye image emitting image light reaching the position of the left eye. The controller 8 is configured to control the second areas 702 on the shutter panel 7 into the light transmissive state. The controller 8 is configured to cause selected subpixels to display the right eye image emitting image light reaching the position of the user's right eye through the second areas 702 in the light transmissive state. For example, the controller 8 is configured to cause at least the certain proportion of subpixels to display the right eye image emitting image light reaching the position of the right eye.

In the example shown in FIG. 10, the controller 8 is configured to cause the subpixels P2 to P4 included in each subpixel group Pg to display the left eye image. The controller 8 is configured to cause the subpixels P7 to P9 included in each subpixel group Pg to display the right eye image.

As shown in FIG. 8, the controller 8 is configured to control third areas 703 on the shutter panel 7 into the light transmissive state during a third period. The controller 8 is configured to control areas on the shutter panel 7 other than the third areas 703 into the light attenuating state during the third period. The third areas 703 are areas different (e.g. at least partially different) from the first areas 701 or the second areas 702. The third areas 703 are areas different (e.g. at least partially different) from the first areas 701 or the second areas 702. The third areas 703 may include parts of the first areas 701 or (e.g. and/or) parts of the second areas 702. The third areas 703 may have the same horizontal length as the first areas 701 or the second areas 702. For example, the controller 8 may cause the outermost shutter area s2 included in the shutter areas s forming the second areas 702 to change from the light transmissive state to the light attenuating state. In this case, the controller 8 may cause the shutter area s5 adjacent to the outermost shutter area s4 opposite to the shutter area s2 included in the shutter areas s forming the second areas 702 to change from the light attenuating state to the light transmissive state.

The controller 8 is configured to control the third areas 703 on the shutter panel 7 into the light transmissive state, and is configured to control the parallax image to be displayed on the display panel 6 as shown in FIG. 11 based on the positions of the user's eyes detected by the position detection device 1. More specifically, the controller 8 is configured to cause selected subpixels to display the left eye image emitting image light reaching the position of the user's left eye light through the third areas 703 in the light transmissive state. For example, the controller 8 is configured to cause at least a certain proportion of subpixels to display the left eye image emitting image light reaching the position of the left eye. The controller 8 is configured to control the third areas 703 on the shutter panel 7 into the light transmissive state, and is configured to cause selected subpixels to display the right eye image emitting image light reaching the position of the user's right eye through the third areas 703 in the light transmissive state. For example, the controller 8 is configured to cause at least the certain proportion of subpixels to display the right eye image emitting image light reaching the position of the right eye. In the example shown in FIG. 11, the controller 8 is configured to cause the subpixels P3 to P5 included in each subpixel group Pg to display the left eye image. The controller 8 is configured to cause the subpixels P8 to P10 included in each subpixel group Pg to display the right eye image.

Similarly, the controller 8 may be configured to control k-th areas on the shutter panel 7 into the light transmissive state during a k-th (k=1 to (2×n)) period. The controller 8 is configured to control the k-th areas on the shutter panel 7 into the light transmissive state, and is configured to control the parallax image to be displayed on the display panel 6 based on the positions of the user's eyes detected by the position detection device 1. More specifically, the controller 8 is configured to cause selected subpixels to display the left eye image emitting image light reaching the position of the user's left eye through the k-th areas in the light transmissive state. For example, the controller 8 is configured to cause at least a certain proportion of subpixels to display the left eye image emitting image light reaching the position of the left eye. In FIG. 1, the controller 8 is configured to cause three subpixels arranged continuous in one direction from a subpixel Pk included in each subpixel group Pg to display the left eye image. The controller 8 is configured to cause opposite three continuous subpixels that are adjacent to two continuous subpixels adjacent to the three subpixels displaying the left eye image to display the right eye image.

Although the controller 8 is configured to control the first areas 701, the second areas 702, and the third areas 703 to enter the light transmissive state in the stated order, the areas may enter the light transmissive state in another order. For example, the controller 8 may be configured to control the first areas 701 to (2×n) areas into the light transmissive state in any order.

In other words, the controller 8 is configured to change at least selected areas from the light transmissive state to the light attenuating state, and is configured to change selected areas in the light attenuating state with the same total size as the areas changed from the light transmissive state to the light attenuating state to the light transmissive state in every certain time cycle. The controller 8 may be configured to change all areas in the light transmissive state to the light attenuating state, and to change selected areas in the light attenuating state with the same total size as the areas changed from the light transmissive state to the light attenuating state to the light transmissive state.

The controller 8 may cause selected subpixels on the display panel 6 emitting image light through the light transmissive areas 71 to display a black image while causing selected areas on the shutter panel 7 to switch between the light attenuating state and the light transmissive state. The black image is, for example, a black image with a certain luminance level. The certain luminance level may be a luminance level with the lowest gradation displayable by the subpixels, or a value corresponding to the luminance level with the gradation equivalent to the lowest gradation. This changes the position of the image viewable by the user's eyes to reduce flickering perceivable to the user's eyes.

The controller 8 may be configured to change the light transmissive areas 71 and the light attenuating areas 72 when raising the luminance level of an image to be displayed by the display panel 6 to higher than the certain level. This causes the user to perceive a significant change in the luminance of the image, thus reducing flickering perceivable to the user when the image position is changed.

The controller 8 may be configured to control the shutter panel 7 and to cause a difference in a duration for each area on the display panel 6 to be in the light transmissive state to fall within a certain range. The certain range set narrower reduces the difference in the duration for each area to receive sunlight, thus lowering the likelihood that some areas are damaged under more sunlight.

The controller 8 may be configured to determine the certain time cycle based on the first information and date and time information, and to change the light transmissive areas 71 and the light attenuating areas 72 on the shutter panel 7 in every certain time cycle. The controller 8 may obtain the first information from the information detection device 2. The controller 8 mounted on the movable object 10 may obtain the first information based on information transmitted from the ECU included in the movable object 10. The date and time information is configured to indicate the current date and time. The controller 8 may obtain the date and time information from an external device through a communication network. The controller 8 may use the date and time information managed by the 3D display device 3.

For example, the controller 8 may determine the certain time cycle based on the device temperature detected by the device temperature sensor 21 included in the information detection device 2. More specifically, the controller 8 may be configured to shorten the certain time cycle as the device temperature received by the obtaining unit 4 from the device temperature sensor 21 is higher. That is, e.g., in an exemplary embodiment, the controller 8 may be configured to shorten the certain time cycle as/with the device temperature received by the obtaining unit 4 from the device temperature sensor 21 increases/increasing. E.g., in an exemplary embodiment, the controller 8 may be configured to shorten the certain time cycle using a certain relationship of (equation etc.) device temperature and certain time cycle, e.g. in a manner proportional to an increase of the device temperature received by the obtaining unit 4 from the device temperature sensor 21. E.g., in an exemplary embodiment, the controller 8 may be configured to shorten the certain time cycle using a certain table assigning certain time cycles to different device temperatures (ranges).

For example, the controller 8 may determine the certain time cycle based on the outside air temperature detected by the outside air temperature sensor 22 included in the information detection device 2. More specifically, the controller 8 may be configured to shorten the certain time cycle as the outside air temperature received by the obtaining unit 4 is higher. That is, e.g., in an exemplary embodiment, the controller 8 may be configured to shorten the certain time cycle as/with the outside air temperature received by the obtaining unit 4 increases/increasing. E.g., in an exemplary embodiment, the controller 8 may be configured to shorten the certain time cycle using a certain relationship of (equation etc.) outside air temperature and certain time cycle, e.g. in a manner proportional to an increase of the outside air temperature received by the obtaining unit 4. E.g., in an exemplary embodiment, the controller 8 may be configured to shorten the certain time cycle using a certain table assigning certain time cycles to different outside air temperatures (ranges).

For example, the controller 8 may determine the certain time cycle based on the illuminance detected by the illuminance sensor 23 included in the information detection device 2. More specifically, the controller 8 may be configured to shorten the certain time cycle as the illuminance received by the obtaining unit 4 from the illuminance sensor 23 is higher. That is, e.g., in an exemplary embodiment, the controller 8 may be configured to shorten the certain time cycle as/with the illuminance received by the obtaining unit 4 from the illuminance sensor 23 increases/increasing. E.g., in an exemplary embodiment, the controller 8 may be configured to shorten the certain time cycle using a certain relationship of (equation etc.) illuminance and certain time cycle, e.g. in a manner proportional to an increase of the illuminance received by the obtaining unit 4 from the illuminance sensor 23. E.g., in an exemplary embodiment, the controller 8 may be configured to shorten the certain time cycle using a certain table assigning certain time cycles to illuminances. The controller 8 may determine the certain time cycle based on the range of illuminance levels based on the lighting information for the headlights obtained by the obtaining unit 4 from the ECU.

For example, the controller 8 may determine the certain time cycle based on the weather detected by the weather information detector 24 included in the information detection device 2. More specifically, the controller 8 may be configured to shorten the certain time cycle when the weather received by the obtaining unit 4 from the weather information detector 24 is sunny than when the received weather is cloudy or rainy. That is, e.g., in an exemplary embodiment, the controller 8 may be configured to shorten the certain time cycle for a case in which the weather received by the obtaining unit 4 from the weather information detector 24 is sunny. E.g., in an exemplary embodiment, the controller 8 may be configured to shorten/adjust the certain time cycle using a table assigning certain time cycles to different kinds of weather (as respectively received/receivable by the obtaining unit 4 from the weather information detector 24).

For example, the controller 8 may determine the certain time cycle based on the position detected by the position detector 25 included in the information detection device 2. More specifically, the controller 8 may be configured to shorten the certain time cycle as the latitude indicating the position of the 3D display device 3 including the display panel 6 received by the obtaining unit 4 from the position detector 25 is lower. That is, e.g., in an exemplary embodiment, the controller 8 may be configured to shorten the certain time cycle as/with the latitude indicating the position of the 3D display device 3 including the display panel 6 received by the obtaining unit 4 from the position detector 25 decreases/decreasing. E.g., in an exemplary embodiment, the controller 8 may be configured to shorten the certain time cycle using a relationship of the latitude indicating the position of the 3D display device 3 including the display panel 6 received by the obtaining unit 4 from the position detector 25 and the certain time cycle. E.g., in an exemplary embodiment, the controller 8 may be configured to shorten the certain time cycle using a table assigning certain time cycles to different latitudes or ranges thereof.

For example, the controller 8 may determine the certain time cycle based on the position detected by the position detector 25 included in the information detection device 2 and the current date. More specifically, when a longitude indicating a position is received by the obtaining unit 4 from the position detector 25, the controller 8 may determine the certain time cycle based on the longitude and the season corresponding to the current date. For example, the controller 8 may be configured to shorten the certain time cycle when the season associated with the position of the 3D display device 3 including the display panel 6 is determined to be summer based on the longitude and the date than when the season is other than summer. That is, e.g., in an exemplary embodiment, the controller 8 may be configured to shorten the certain time cycle when the season associated with the position of the 3D display device 3 including the display panel 6 is determined to be summer based on the longitude and the date.

For example, the controller 8 may determine the certain time cycle based on the movement direction of the 3D display device 3 including the display panel 6 detected by the direction sensor 26 included in the information detection device 2. More specifically, the controller 8 may be configured to shorten the certain time cycle when the movement direction of the 3D display device 3 received by the obtaining unit 4 from the direction sensor 26 includes a greater component in the south direction. That is, e.g., in an exemplary embodiment, the controller 8 may be configured to shorten the certain time cycle when the movement direction of the 3D display device 3 received by the obtaining unit 4 from the direction sensor 26 includes an increasing component in the south direction. E.g., in an exemplary embodiment, the controller 8 may be configured to shorten the certain time cycle using a certain relationship of a component in the south direction of the movement direction (or a variation thereof) and the certain time cycle. E.g., in an exemplary embodiment, the controller 8 may be configured to shorten the certain time cycle using a table assigning certain time cycles to different components in the south direction of the movement direction of the 3D display device 3. The controller 8 may determine the certain time cycle based on the movement direction and time. For example, the controller 8 may extend the certain time cycle when the movement direction is in a southern direction and the time is nighttime than when the time is daytime.

The controller 8 is not limited to the structure described above, and may determine the certain time cycle using at least one item of information obtained from the information detection device 2 or the ECU.

As described above, the controller 8 according to the present embodiment is configured to change the light transmissive areas 71 and the light attenuating areas 72 in every certain time cycle, and is configured to cause each subpixel to display either the left eye image or the right eye image depending on the positions of the user's eyes and the positions of the light transmissive areas 71. The areas irradiated with sunlight transmitted through the light transmissive areas 71 can thus be changed in the active area 61 of the display panel 6. This avoids continuous irradiation of a specific part of the active area 61 with sunlight. This avoids early damage in a specific part of the active area 61, and reduces the frequency of repair or replacement of the display panel 6 due to such early damage in a specific part.

The controller 8 according to one embodiment of the present disclosure is configured to change at least selected ones of the areas in the light transmissive state to the light attenuating state, and is configured to change selected areas in the light attenuating state with the same total size as the areas changed from the light transmissive state to the light attenuating state to the light transmissive state. This structure changes the position of the image perceived by each eye of the user less noticeably than when all the light transmissive areas 71 are changed to the light attenuating areas 72 and all the light attenuating areas 72 are changed to the light transmissive areas 71 on the shutter panel 7. This reduces flickering in the image perceivable to the user's eyes.

The controller 8 according to one embodiment of the present disclosure is configured to change all areas in the light transmissive state to the light attenuating state, and is configured to change selected areas in the light attenuating state to have the same size as the areas changed from the light transmissive state to the light attenuating state to the light transmissive state. This structure allows fewer areas to be irradiated continuously with sunlight in the display panel 6 than the structure for changing selected areas in the light transmissive state to the light attenuating state and selected areas in the light attenuating state to the light transmissive state. This avoids early damage in a specific part of the active area 61, and reduces the frequency of repair or replacement of the display panel 6 due to such early damage in a specific part.

The controller 8 according to the present embodiment is configured to control the shutter panel 7 and to cause a difference in a duration for each area on the display panel 6 to be in the light transmissive state to fall within a certain range. This enables the active area 61 of the display panel 6 to avoid being irradiated with sunlight in its specific area for a long time. This avoids early damage in a specific part of the active area 61, and reduces the frequency of repair or replacement of the display panel 6 due to such early damage in a specific part.

The controller 8 according to the present embodiment is configured to change the certain time cycle based on at least either the first information or the date and time information. This structure may be configured to change areas to be irradiated with sunlight more rapidly when the intensity of sunlight is high than when the intensity of sunlight is low. This structure avoids early damage of, for example, a specific part of the active area 61 irradiated with sunlight during a time zone with high sunlight intensity. This reduces the frequency of repair or replacement of the display panel 6 due to such early damage in a specific part.

Although the embodiment above is described as a typical example, it will be apparent to those skilled in the art that various modifications and substitutions can be made to the embodiment without departing from the spirit and scope of the present invention. Thus, the above embodiment should not be construed to be restrictive, but may be variously modified within the spirit and scope of the claimed invention. For example, multiple structural blocks described in the above embodiment or examples may be combined into a structural block, or each structural block may be divided.

Although the subpixel groups Pg in the display panel 6 according to the embodiment described above are repeatedly arranged in the horizontal direction and the vertical direction, the disclosure is not limited to this embodiment. For example, as shown in FIG. 12, the subpixel groups Pg may be repeatedly arranged in the horizontal direction, and repeatedly arranged in the vertical direction at positions shifted by one subpixel with respect to the subpixels arranged in the horizontal direction. In this structure, the shutter panel 7 is configured to define the light transmissive areas 71 and the light attenuating areas 72 as shown in FIG. 13 to cause image light from the subpixels to be transmitted and reduced at the same time at positions corresponding to the multiple subpixel groups Pg in the display panel 6. More specifically, each shutter area s on the shutter panel 7 may be sized to allow transmission of image light from an image with the size of one subpixel to either eye of the user. In this structure, the controller 8 is configured to control the multiple shutter areas s that are arranged continuously in the horizontal direction into the light transmissive state. The controller 8 is configured to control the multiple shutter areas s in the light transmissive state arranged continuously in the horizontal direction to be at positions shifted by the length sw of one shutter area s in the horizontal direction.

Although the controller 8 according to the above embodiment is configured to change subpixels for displaying the right eye image or the left eye image based on the positions of the user's eyes and the positions of areas in the light transmissive state, the disclosure is not limited to this embodiment. For example, the controller 8 may use the fixed positions of the user's eyes. In this structure, the controller 8 is configured to change subpixels for displaying the right eye image or the left eye image based on the positions of areas in the light transmissive state. In this case, the 3D display system 100 may not include the position detection device 1. The obtaining unit 4 may not obtain the positions of the eyes.

REFERENCE SIGNS LIST 1 position detection device
2 information detection device
3 3D display device
4 obtaining unit
5 illuminator
6 display panel
7 shutter panel
8 controller
10 movable object
21 device temperature sensor
22 outside air temperature sensor
23 illuminance sensor
24 weather information detector
25 position detector
26 direction sensor
61 active area
61aL left viewable area
61aR right viewable area
61bL left unviewable area
61bR right unviewable area
71 light transmissive area
72 light attenuating area
701 first area
702 second area
703 third area
100 3D display system
400 head-up display system
410 optical member
420 projection reception member
430 projection screen
440 optical path
450 virtual image

The invention claimed is:

1. A three-dimensional display device, comprising:
a display panel including subpixels configured to display a parallax image including a first image and a second image having parallax between the images;
a shutter panel configured to define a traveling direction of image light representing the parallax image from the display panel; and
a controller configured to change, in a certain time cycle, areas on the shutter panel in a light transmissive state to transmit the image light with at least a certain transmittance and areas on the shutter panel in a light attenuating state to transmit the image light with a transmittance lower than the transmittance in the light transmissive state, and to change the subpixels to display the first image and the second image based on positions of the areas in the light transmissive state, wherein
the areas in the light transmissive state are first areas,
the areas in the light attenuating state are second areas, the second areas including portions adjacent to the first areas,
the controller is configured to change, in the certain time cycle, the first areas and the second areas such that the first areas are smaller than the second areas and the first areas move with respect to the display panel for each certain time cycle,
the controller is configured to change, in the certain time cycle, the subpixels of the display panel such that the parallax image moves with movement of the first areas and the second areas,
in each time cycle, the first areas move such that a plurality of the portions immediately adjacent to the first areas before the time cycle change to the light transmissive state after the time cycle, and
the display panel has a surface configured to face a user, and the certain time cycle is set to correspond with a period for which continuous irradiation of incoming light directly on a part of the surface configured to face the user is to be avoided, the incoming light coming from a light source external to the three-dimensional display device.

2. The three-dimensional display device according to claim 1, wherein
the controller is configured to change at least selected ones of the areas in the light transmissive state to the light attenuating state, and change selected ones of the areas in the light attenuating state with the same total size as the at least selected ones of the areas in the light transmissive state to the light transmissive state.

3. The three-dimensional display device according to claim 2, wherein
the controller is configured to change all the areas in the light transmissive state to the light attenuating state, and change selected ones of the areas in the light attenuating state with the same total size as the areas in the light transmissive state to the light transmissive state.

4. The three-dimensional display device according to claim 2, wherein
the controller is configured to determine a size of the at least selected ones of the areas to be changed from the light transmissive state to the light attenuating state based on information associated with performance degradation or a failure factor for the display panel and/or date and time information.

5. The three-dimensional display device according to claim 1, wherein the controller is configured to cause selected subpixels emitting image light through the light transmissive areas to display a black image while causing selected areas on the shutter panel to switch between the light attenuating state and the light transmissive state, wherein optionally the black image is a black image with a certain luminance level, wherein further optionally the certain luminance level is a luminance level with a lowest gradation displayable by the subpixels, or a value corresponding to the luminance level with a gradation equivalent to the lowest gradation.

6. The three-dimensional display device according to claim 1, wherein
the controller is configured to control the shutter panel to cause a difference in a duration for which each area on the display panel is in the light transmissive state to fall within a certain range.

7. The three-dimensional display device according to claim 1, wherein
the controller is configured to change the certain time cycle based on first information associated with performance degradation or a failure factor for the display panel and/or date and time information.

8. The three-dimensional display device according to claim 7, wherein
the first information includes one or more of a temperature, a movement direction, at least one of a latitude and a longitude of the display panel, an air temperature, an illuminance around the display panel, and weather, and/or
the date and time information includes a date and time.

9. The three-dimensional display device according to claim 1, wherein the shutter panel includes a liquid crystal shutter.

10. A three-dimensional display system, comprising:
a three-dimensional display device according to claim 1; and
a position detection device configured to detect a position of one of the eyes of the user.

11. The three-dimensional display system according to claim 10,
wherein the position detection device further includes a sensor, and
wherein the position detection device is configured to detect the position of the user's head with the sensor and the position of the one of the eyes of the user based on the position of the user's head.

12. The three-dimensional display system according to claim 10, further comprising an information detection device configured to detect information, the information detection device including one or more components selected from a device temperature sensor, an outside air temperature sensor, an illuminance sensor, a weather information detector, a position detector, and a direction sensor, wherein optionally
the device temperature sensor being configured to detect the temperature of the display panel, the device temperature sensor being configured to output the detected temperature to the three-dimensional display device and the controller being configured to determine the certain time cycle based on the detected temperature, and/or
the outside air temperature sensor being configured to detect the air temperature around the display panel, the outside air temperature sensor being configured to output the detected air temperature to the three-dimensional display device and the controller being configured to determine the certain time cycle based on the detected air temperature, and/or
the illuminance sensor being configured to detect an illuminance around the display panel, the illuminance sensor being configured to output the detected illuminance to the three-dimensional display device and the controller being configured to determine the certain time cycle based on the detected illuminance, and/or
the weather information detector being configured to detect weather information by receiving the information with/from an external device through a communication network, the weather information indicating the weather conditions or the weather at a location of the display panel, the weather information detector being configured to output the detected weather information to the three-dimensional display device and the controller being configured to determine the certain time cycle based on the detected weather information, and/or
the position detector being configured to detect the position of the three-dimensional display device, and then output the detected position to the three-dimensional display device and the controller being configured to determine the certain time cycle based on the detected position, and/or
the direction sensor being configured to detect the direction in which the display panel moves, the direction sensor being configured to output the detected direction to the three-dimensional display device and the controller being configured to determine the certain time cycle based on the detected direction.

13. The three-dimensional display system according to claim 12, wherein the three-dimensional display device further includes an obtaining unit configured to obtain the information detected by the information detection device, and wherein
the controller is configured to shorten the certain time cycle as the device temperature received by the obtaining unit from the device temperature sensor is higher and/or
the controller is configured to shorten the certain time cycle as the air temperature received by the obtaining unit is higher and/or
the controller is configured to shorten the certain time cycle as the illuminance received by the obtaining unit from the illuminance sensor is higher and/or
the controller is configured to shorten the certain time cycle when the weather information received by the obtaining unit from the weather information detector is sunny weather than when the received weather is cloudy weather or rainy weather and/or the controller is configured to shorten the certain time cycle as a latitude indicating the position of the three-dimensional display device received by the obtaining unit from the position detector is lower and/or, when a longitude indicating a position is received by the obtaining unit from the position detector, the controller is configured to determine the certain time cycle based on the longitude and a season corresponding to a current date and/or the controller is configured to shorten the certain time cycle when a season associated with the position of three-dimensional display device is determined to be summer based on the longitude and the date than when the season is other than summer and/or the controller is configured to shorten the certain time cycle when the movement direction of the three-dimensional display device received by the obtaining unit from the direction sensor includes a greater component in the south direction.

14. A movable object, comprising:
a three-dimensional display system according to claim 13, and
an electric control unit, ECU, wherein the controller is configured to determine the certain time cycle based on a range of illuminance levels based on lighting information for headlights obtained by the obtaining unit from the ECU.

15. A head-up display system, comprising:
a three-dimensional display system according to claim 10, and
an optical member and/or a projection reception member including a projection screen.

16. A movable object, comprising:
a three-dimensional display system according to claim 10.

17. A head-up display system, comprising:
a three-dimensional display device according to claim 1, and
an optical member and/or a projection reception member including a projection screen.

18. A movable object, comprising:
a head-up display system according to claim 17.

19. A movable object, comprising:
a three-dimensional display device according to claim 1.

20. The three-dimensional display device according to claim 1, wherein
the controller is further configured to:
change at least selected ones of the areas in the light transmissive state, each having a size smaller than a total size of each of the areas in the light attenuating state, to the light attenuating state, and
change selected ones of the areas in the light attenuating state with the same total size as the at least selected ones of the areas in the light transmissive state to the light transmissive state.

\* \* \* \* \*